(12) United States Patent
Hwang

(10) Patent No.: US 12,065,570 B2
(45) Date of Patent: Aug. 20, 2024

(54) ECO-FRIENDLY SYNTHETIC WOOD CONTAINING COFFEE GROUNDS AND MANUFACTURING METHOD THEREOF

(71) Applicant: DONG HA, Pocheon-si (KR)

(72) Inventor: Jae Soon Hwang, Yangju-si (KR)

(73) Assignee: DONG HA, Pocheon-si (KR)

( * ) Notice: Subject to any disclaimer, the term of this patent is extended or adjusted under 35 U.S.C. 154(b) by 282 days.

(21) Appl. No.: 17/745,335

(22) Filed: May 16, 2022

(65) Prior Publication Data

US 2023/0365810 A1 Nov. 16, 2023

(51) Int. Cl.

| | |
|---|---|
| *C08L 97/02* | (2006.01) |
| *C08J 3/20* | (2006.01) |
| *C08L 67/02* | (2006.01) |
| *B29B 9/06* | (2006.01) |
| *B29K 67/00* | (2006.01) |
| *B29K 105/00* | (2006.01) |
| *B29K 105/16* | (2006.01) |
| *B29K 509/00* | (2006.01) |
| *B29K 511/14* | (2006.01) |

(52) U.S. Cl.
CPC .............. *C08L 97/02* (2013.01); *C08J 3/203* (2013.01); *C08L 67/02* (2013.01); *B29B 9/06* (2013.01); *B29K 2067/003* (2013.01); *B29K 2105/0032* (2013.01); *B29K 2105/16* (2013.01); *B29K 2509/00* (2013.01); *B29K 2511/14* (2013.01); *C08J 2367/02* (2013.01); *C08J 2397/02* (2013.01); *C08J 2423/06* (2013.01); *C08J 2467/02* (2013.01); *C08J 2497/02* (2013.01); *C08J 2499/00* (2013.01); *C08L 2205/035* (2013.01); *C08L 2205/06* (2013.01); *C08L 2205/16* (2013.01); *C08L 2207/20* (2013.01)

(58) Field of Classification Search
CPC .... C08L 97/02; C08L 67/02; C08L 2205/035; C08L 2205/06; C08L 2205/16; C08L 2207/20; C08J 3/203; C08J 2367/02; C08J 2397/02; C08J 2423/06; C08J 2467/02; C08J 2497/02; C08J 2499/00; B29B 9/06; B29K 2067/003; B29K 2105/0032; B29K 2105/16; B29K 2509/00; B29K 2511/14
USPC ......................................................... 524/14
See application file for complete search history.

(56) References Cited

FOREIGN PATENT DOCUMENTS

| KR | 20170030163 A | | 3/2017 |
|---|---|---|---|
| KR | 20190097431 A | * | 8/2019 |

OTHER PUBLICATIONS

Machine translation of KR20190097431A (Year: 2019).*

* cited by examiner

*Primary Examiner* — Ling Siu Cho
*Assistant Examiner* — Ronald Grinsted
(74) *Attorney, Agent, or Firm* — STIP Law Group, LLC

(57) ABSTRACT

The disclosure provides eco-friendly synthetic wood containing coffee grounds, which uses, as main components, coffee grounds and waste gypsum, which are waste resources, and PETG recycled from waste plastic, thereby contributing to protection of the environment, and which enhances formability, post-processability, and a weather resistance of the synthetic wood by reducing a ratio of shrinking-swelling and a water absorption factor of the synthetic wood, and a manufacturing method thereof.

4 Claims, 7 Drawing Sheets

ECO-FRIENDLY SYNTHETIC WOOD CONTAINING COFFEE GROUNDS AND MANUFACTURING METHOD THEREOF

TECHNICAL FIELD

The disclosure relates to eco-friendly synthetic wood containing coffee grounds and a manufacturing method thereof, and more particularly, to eco-friendly synthetic wood containing coffee grounds, which uses, as main components, coffee grounds and waste gypsum, which are waste resources, and polyethylene terephthalate glycol (PETG) recycled from waste plastic, thereby contributing to protection of the environment, and which can reduce defects of synthetic wood by reducing a ratio of shrinking-swelling and a water absorption factor of the synthetic wood, and can enhance formability, post-processability, a weather resistance, a thermal resistance, and flame retardancy of the synthetic wood, and a manufacturing method thereof.

BACKGROUND ART

Synthetic wood contains wood fiber by 50% or more, and may refer to flooring installed outdoors. There are various kinds of synthetic wood and the synthetic wood contains wood flour, chaff, weed, etc. as main components.

The wood flour may cause defects of the synthetic wood, such as cracking, swelling, splintering, warping, etc., due to a high content of lignin as time is elapsed. The chaff has characteristics of a high proportion and of having rough fiber, and to this end, the chaff may reduce a lifespan of a screw of a cylinder of a machine, and may have a problem that it is not easy to process due to low processability. The reed has the demerits that processes of collecting, pulverizing, and processing reed are so complicated, and fine dust is generated when reed is pulverized and harms the human body, and powdered reed is so light that it is difficult to transfer from a hopper and to mold with the reed.

Related-art synthetic wood may be manufactured by mixing reed and wood flour. In this case, it may be difficult to mix and to mold due to a difference in proportions of the reed and the wood flour, and furthermore, since there is a difference in particle shapes of the reed and the wood flour, an aesthetic feature of synthetic wood may be degraded after a sanding (brushing) treatment which is post-processing.

In addition, one of the main causes of the defects of the synthetic wood is a ratio of shrinking-swelling. In the case of related-art synthetic wood manufactured by mixing reed and wood flour, a ratio of shrinking-swelling and a water absorption factor are over predetermined levels, and thus, there is a problem that defects are frequently caused when synthetic wood is manufactured.

According to a study led by Harvard School of Public Health researchers, it was found that women who drank four cups of 8 ounces of coffee (about 227 ml) every day reduced the risk of depression by 20%, and it was also found that caffeine contained in coffee affected brain chemicals such as serotonin or dopamine.

In addition, two cups of 8 ounces of coffee contain about 200 mg of caffeine, and a result of a research shows that this amount of coffee enhances long-term memory, and taking 200-300 mg of caffeine per day may enhance a blood flow rate when a person takes a rest, and may help to perform the function of the heart well, and drinking two cups of coffee per day may help to prevent liver disease such as cirrhosis.

According to the results of 28 studies of the Harvard School researchers, it was found that drinking coffee reduced the risk of type 2 diabetes by 33%, and men drinking coffee daily reduced the risk of gout by 59%. In addition, coffee is effective in reducing uric acid levels in blood, and the result of a study in 2012 showed that women drinking three or more cups of coffee per day greatly reduced the risk of getting basal cell carcinoma.

As such effects of coffee are known, annual coffee consumption is increasing, and, with increasing coffee imports, coffee grounds remaining after coffee is brewed significantly increase each year. Coffee grounds are mainly produced in coffee shops, coffee manufacturing factories, etc., and according to statistical data of May of 2017, there were 90,000 coffee shops in Korea, which was more than the sum of chicken restaurants and convenience stores.

However, Ministry of Environment's measures to recycle coffee grounds are still in its infancy. The coffee grounds are classified as municipal wastes under Waste Control Act, and most of them are buried or incinerated, and recently, the Ministry of Environment revised related rules of Waste Control Act to enable a person who has filed a report on waste treatment to collect, transport, and recycle coffee grounds.

In addition, since coffee grounds have an excellent humidity control capability and have directionality, these characteristics may be utilized when the coffee grounds are used for synthetic wood. However, when coffee grounds are recycled, their content may be minimized and then a large amount of separate chemical additive may be added to manufacture synthetic wood. Therefore, the synthetic wood may not be eco-friendly and efficiency of recycling coffee grounds may be reduced.

Meanwhile, in a desulfurization process or a process of producing phosphoric acid, hydrofluoric acid, boron, titanium, a large amount of waste gypsum may be produced, and gypsum produced in this way contains impurities therein, and, when the gypsum is directly used for a product like cement and a gypsum board as it is, it may degrade strength and durability and may not produce actual results due to limits to throughput. If waste gypsum is naturally deposited, there is the risk of contaminating underground water.

Up to now, only through a complicated refining process including cleaning, neutralizing, calcining, granulating, etc., waste gypsum is recycled. Considering limited allowance to use due to environmental damage or the position of a producer producing gypsum, it is more economical to pile up waste gypsum in a gypsum mining place than to spend money in treating waste gypsum. For this reason, recycling of waste gypsum is avoided. In Korea, 3 million tons or more of waste gypsum are currently produced a year, and about 20 million tons of gypsum are piled up. In advanced countries, for example, in U.S.A., 1 trillion tons or more of waste gypsum are piled up, which must be globally settled.

PRIOR ART LITERATURE

Patent Literature (Patent Literature 1) Korean Patent Laid-Open Publication No. 2017-0030163

DETAILED DESCRIPTION OF THE PRESENT DISCLOSURE

Technical Objects

The disclosure aims at providing an eco-friendly synthetic wood containing coffee grounds, which makes the best use of PETG recycled from waste plastic, and coffee grounds and waste gypsum which are wastes, and excludes chemical additives as much as possible, thereby having eco-friendly characteristics, and can reduce a defect of a product by reducing a ratio of shrinking-swelling and a water absorption factor of synthetic wood, and can enhance formability, post-processability, a weather resistance, a thermal resistance, and flame retardancy, and a manufacturing method thereof.

Technical Solving Means

One aspect of the disclosure is to provide eco-friendly synthetic wood containing coffee grounds, the synthetic wood including: coffee grounds; for 100 parts by weight of the coffee grounds, 250 to 550 parts by weight of wood fiber; 120 to 300 parts by weight of polyethylene terephthalate glycol (PETG); 20 to 100 parts by weight of waste gypsum; 5 to 15 parts by weight of a polyethylene (PE)-based lubricant; and 5 to 15 parts by weight of an inorganic pigment. According to a preferred aspect of the disclosure, the coffee grounds may have a water content of 15% or less, and a content of ester-based oil may be 14 to 16% by weight for the total weight of the coffee grounds, and the waste gypsum may have a water content of 5% or less.

Another aspect of the disclosure is to provide a method for manufacturing eco-friendly synthetic wood containing coffee grounds, the method including: a first step of preparing a mixture by mixing coffee grounds, and, for 100 parts by weight of the coffee grounds, 250 to 550 parts by weight of wood fiber, 120 to 300 parts by PETG, 20 to 100 parts by weight of waste gypsum, 5 to 15 parts by weight of a PE-based lubricant, and 5 to 15 parts by weight of an inorganic pigment in a mixer at 70 to 100° C.; a second step of cooling the mixture two times to reduce a temperature of the mixture to 40° C. or less; a third step of putting the cooled mixture into an extruder and making pellets; and a fourth step of putting the pellets into a molding device and molding synthetic wood.

According to a preferred aspect of the disclosure, before the first step, an operation of drying the coffee grounds in a screw heater method to make a water content of the coffee grounds be 15% or less may be performed, and, at the first step, waste gypsum having a water content of 5% or less may be used.

Advantageous Effect

According to an aspect of the disclosure, use of a chemical additive may be avoided as much as possible, and coffee grounds and waste gypsum which are wastes, and PETG recycled from waste plastic are included as main components, so that eco-friendly synthetic wood may be manufactured, and amounts of wastes and waste plastic thrown away may be reduced, so that the environment can be protected. In addition, defects of a product may be reduced by reducing a ratio of shrinking-swelling and a water absorption factor of synthetic wood, and the waste gypsum may compensate for a low thermal resistance and low frame retardancy of PETG, and there is an effect that synthetic wood having excellent formability, post-processability, weather resistance, thermal resistance, and flame retardancy is provided.

BEST MODE FOR EMBODYING THE INVENTION

Hereinafter, preferred embodiments of the disclosure will be described. However, the embodiments of the disclosure may be embodied in many different forms and should not be construed as limited to the embodiments set forth herein. In addition, it will be further understood that the term "include," when used in this specification, does not preclude the presence or addition of one or more other components, and means further inclusion of other components.

The disclosure relates to synthetic wood which is made by recycling coffee grounds and other waste resources. As other waste resources, PETG recycled from waste plastic and waste gypsum are used. In this case, the synthetic wood of the present embodiment may have a problem caused by a low thermal resistance of PETG, but waste gypsum may serve as a filler and a flame retardant, thereby compensating for the low thermal resistance and simultaneously enhancing flame retardancy of synthetic wood.

The synthetic wood of the disclosure may be made in various forms like a board or lumber, for example, and may include coffee grounds, wood fiber, PETG, waste gypsum, a PE-based lubricant, and an inorganic pigment.

In this case, the synthetic wood may include coffee grounds, and for 100 parts by weight of the coffee grounds, 250 to 550 parts by weight of wood fiber, 120 to 300 parts by weight of polyethylene terephthalate glycol (PETG), 20 to 100 parts by weight of waste gypsum, 5 to 15 parts by weight of a PE-based lubricant, and 5 to 15 parts by weight of an inorganic pigment.

Figure 2:
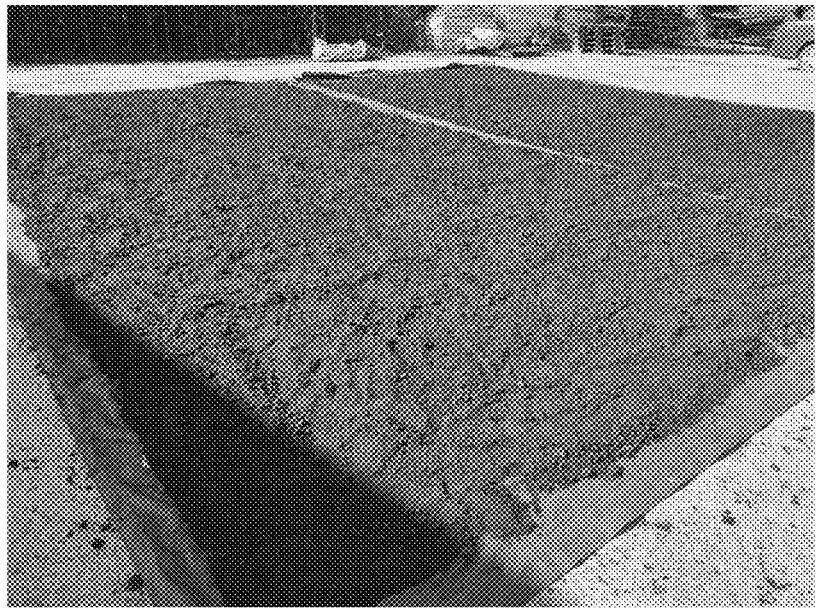
FIG. 2 is a photo illustrating dried coffee grounds to be used when synthetic wood is manufactured according to the disclosure.

As shown in FIG. 2, in the present embodiment, it is preferable to use coffee grounds having a moisture content of 15% or less. In this case, tannin contained in the coffee grounds is a natural pigment and may prevent the pigment from being decolored when being exposed to ultraviolet rays, and ester-based oil included in the coffee grounds may perform the role of a natural oil stain and the role of a lubricant, and also, may prevent occurrence of fine dust of wood flour when a product is produced, so that a lifespan of a production facility can increase.

Since the coffee grounds have a characteristic of controlling ambient humidity and have directionality, these characteristics may act as advantages distinct from other synthetic woods when the coffee grounds are utilized for synthetic wood.

In addition, since the coffee grounds have natural color of coffee, the synthetic wood may have the natural color of coffee, and simultaneously, may have an effect that decoloring by ultraviolet rays is prevented.

In this case, the coffee grounds should have a water content of 15% or less. When the water content of the coffee grounds exceeds 15%, a binding force between the coffee grounds and the PETG may be reduced due to moisture and it may be difficult to get an appropriate strength to manufacture synthetic wood.

Since coffee grounds produced from a normal coffee manufacturing factory has a water content of 60% or more, it is preferable to use coffee grounds having a water content of about 30%. In addition, the coffee grounds may have 14 to 16% by weight of ester-based oil for the total weight of the coffee grounds. The ester-based oil may perform the roles of a UV blocking agent, a stabilizer, a lubricant, an antioxidant, and a pigment which are added when existing synthetic wood is manufactured. In the present embodiment, when the synthetic wood is manufactured, chemical additives such as a UV blocking agent, a stabilizer, a lubricant, an antioxidant, and a pigment may not be added or their amount may be minimized, so that an eco-friendly synthetic wood may be manufactured.

When the content of the ester-based oil is less than 14% by weight, the roles of the UV blocking agent, the stabilizer, the lubricant, the antioxidant, and the pigment are not well implemented, and, when the content of the ester-based oil exceeds 16% by weight, the effects of the UV blocking agent, the stabilizer, the lubricant, the antioxidant, and the pigment are not greatly enhanced. Accordingly, it is preferable to set the maximum value of the content of the ester-based oil to 16% by weight, considering a manufacturing cost.

The wood fiber may be, for example, reed, chaff, wood flour, etc., but the disclosure is not limited thereto. The wood fiber may perform the role of absorbing oil of the coffee grounds.

When the content of the wood fiber is less than 250 parts by weight for 100 parts by weight of the coffee grounds, the content of oil included in the coffee grounds may relatively increase, causing a problem of contraction and deformation of a product, and the contents of tannin and ester-based oil contained in the coffee grounds are low, so that it is difficult to achieve effects on decoloring of the wood fiber by UV and a weather resistance.

In addition, when the content of the wood fiber exceeds 550 parts by weight for 100 parts by weight of the coffee grounds, the contents of tannin and ester-based oil contained in the coffee grounds are low, so that it is difficult to achieve effects on decoloring of the wood fiber by UV and a weather resistance.

The PETG may be obtained from scraps produced when extrusion injection molding is performed, or disposable containers. The PETG has so excellent processability that it is easy to manufacture a complicated shape, and has excellent thermal adhesion, thermal resistance, chemical resistance, mechanical material property. In addition, the PETG is easy to recycle, and as in the present embodiment, the PETG is a material that is suitable for using by processing waste plastic and collecting therefrom.

In this case, a particle size of the PETG may be preferably 3 to 5 mm. When the particle size of the PETG is less than 3 mm, jamming may occur between resins due to heat generated during a griding process. When the particle size of the PETG exceeds 5 mm and wood flour, coffee grounds and PETG are separately molded due to a difference in particle sizes when a product is molded, it is difficult to expect a constant material property.

The PETG may include 120 to 300 parts by weight for 100 parts by weight of the coffee grounds. When the content of the PETG is less than 120 parts by weight for 100 parts by weight of the coffee grounds, it is difficult to expect the effects of enhancing a weather resistance and a strength of the synthetic wood and reducing a ratio of shrinking-swelling. When the content of the PETG exceeds 300 parts by weight for 100 parts by weight of the coffee grounds, the amount of added PETG may be excessive and there may be a problem that shrinking-swelling increases.

In addition, the content of the coffee grounds may be relatively low and there may be a problem that it is difficult for the synthetic wood to satisfy a condition for providing excellent humidity controlling capability and directionality, which are expected from coffee grounds.

The PETG performs the role of determining a strength of the synthetic wood. Accordingly, in order to increase the strength of the synthetic wood to be manufactured, the amount of PETG has only to be increased, and, in order to make eco-friendly synthetic wood rather than synthetic wood having a high strength, the amount of PETG has only to be reduced.

In addition, the PETG may be coupled with natural oil of the coffee grounds and may perform the role of an oil stain to prevent permeation of atmospheric moisture, and may be easy to manufacture and use as a product utilizing existing lumber like a floorboard.

The gypsum is an oxide produced from nature and is expressed by the chemical formula $CaSO_4 \cdot 2H_2O$. The color of gypsum is colorless, white, light grey, brown, yellow, red, and has glass-like luster or pearly luster. In addition, a variant of gypsum having fibrous tissue may have silky luster. The gypsum is transparent or translucent, and is colorless when it is in the form of a foil. In addition, the gypsum is a mineral belonging to the monoclinic system, and may have hardness of 2 and specific gravity of 2.32. The gypsum is mainly used to manufacture cement or a fertilizer.

The waste gypsum used in the present embodiment is residues that are left after cement or a fertilizer is made, and currently, 20 million tons of waste gypsum are thrown away on a coastal area of Yeosu, causing environmental damage. Preferably, the waste gypsum used in the present embodiment may be dried to have a water content of 5% or less. The waste gypsum of the water content of 5% or less has similar components to ground calcium carbonate (calcium carbonate), and may substitute for the role of calcium carbonate.

The PE-based lubricant may serve to prevent the waste plastic, the coffee grounds, and the wood fiber from being carbonized by temperature in a screw of a cylinder and to smoothen a flow. Preferably, a LDPE wax-based product of 102N of LION CHEMTECH may be used as a PE wax-based lubricant in the present embodiment.

When the content of the PE-based lubricant is less than 5 parts by weight for 100 parts by weight of the coffee grounds, a flow of a raw material around a screw of a cylinder of an extruder may not be smooth and there may be a problem that a short-shot product is made. When the content of the PE-based lubricant exceeds 15 parts by weight for 100 parts by weight of the coffee grounds, a binding force between raw materials may be reduced and a strength of a product may be reduced, and there may be a problem in a function of the product.

The inorganic pigment may preferably use a sulfur oxide, an iron oxide, or a titanium oxide ($TiO_2$), and other components may be added when necessary, but the disclosure is not limited thereto When the content of the inorganic pigment is less than 5 parts by weight for 100 parts by weight of the coffee grounds, a decoloring problem by UV rays may occur, and, when the content of the inorganic pigment exceeds 15 parts by weight for 100 parts by weight of the coffee grounds, the inorganic pigment may flow out to the outside, causing a problem of contamination when contacting an external object.

In addition, an organic pigment may be additionally used when necessary, for the purpose of changing color of wood. In this case, the organic pigment may use, for example, carbon black.

Hereinafter, a method for manufacturing eco-friendly synthetic wood containing coffee grounds of the disclosure will be described in detail with reference to an embodiment.

Figure 1:
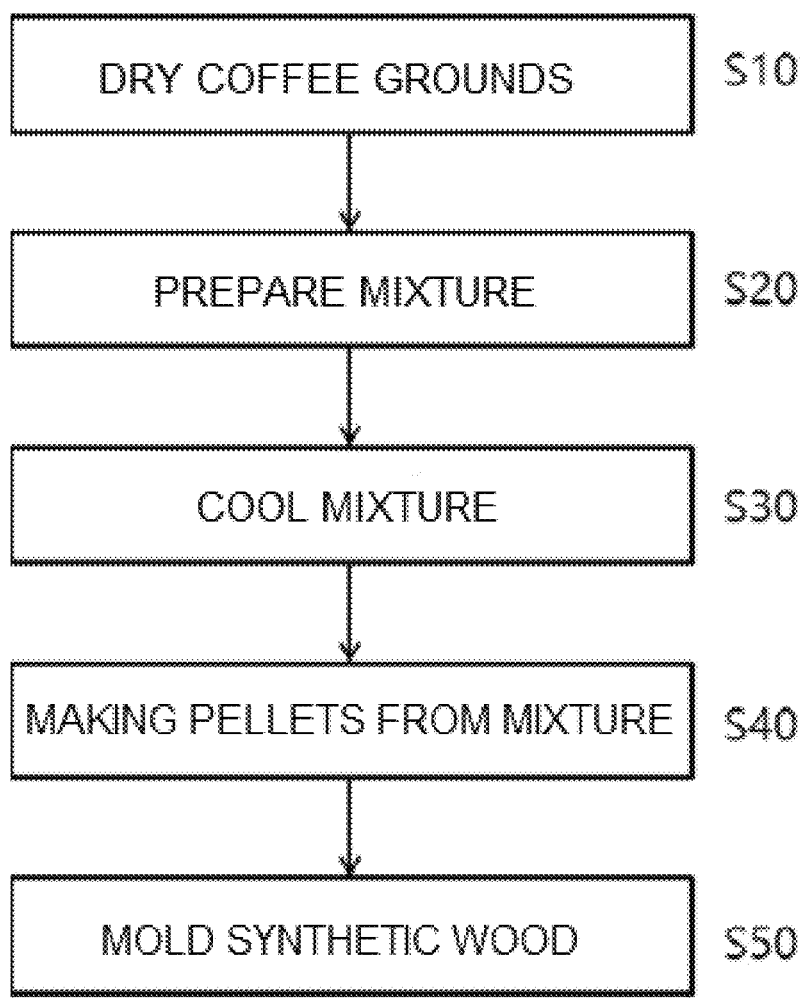
FIG. 1 is a flowchart illustrating a manufacturing method of synthetic wood according an embodiment of the disclosure.

Referring to FIG. 1, a first step (S20) of preparing a mixture by mixing various materials is performed.

Materials used at this step may include coffee grounds, and for 100 parts by weight of the coffee grounds, 250 to 550 parts by weight of wood fiber, 120 to 300 parts by weight of PETG, 20 to 100 parts by weight of waste gypsum, 5 to 15 parts by weight of a PE-based lubricant, and 5 to parts by weight of an inorganic pigment.

Figure 3:
FIG. 3 is a photo illustrating collected coffee grounds.
Figure 4:
FIG. 4 is a photo illustrating ground coffee grounds of FIG. 3.

In this case, the coffee grounds collected first may be light brown due to a high water content as shown in FIG. 3. Since the coffee grounds having a high water content may not be used as a raw material of synthetic wood, a step of drying the collected coffee grounds by using a large-scale dryer to reduce the water content to 15% or less after grinding as shown in FIG. 4 is performed (S10).

In this case, since a hot-air drying method may have very low drying efficiency due to the high water content of the coffee grounds collected first, the operation of drying the coffee grounds may be performed by a screw heater method having excellent drying efficiency.

A drying device of a screw heater method used in the present embodiment may include a semi-circular electric furnace having an upper portion opened, a screw installed in the electric furnace in a longitudinal direction, and a heater disposed under the electric furnace. The coffee grounds may be transferred through the screw, and may be dried by evaporating moisture included in the coffee grounds by heating by the heater installed under the screw.

As shown in FIG. 2, the coffee grounds dried in this method has the dark brown color, and in this case, 14 to 16% by weight of ester-based oil may be included with respect to the total eight of the coffee grounds.

The ester-based oil is used to substitute for the roles of a UV blocking agent, a stabilizer, a lubricant, an antioxidant, and a pigment, which are added when related-art synthetic wood is manufactured, and in the present embodiment, when the synthetic wood is manufactured, a chemical additive such as a UV blocking agent, a stabilizer, a lubricant, an antioxidant, and a pigment may not be added or an amount thereof may be minimized, and accordingly, eco-friendly synthetic wood may be manufactured.

Figure 5:
FIG. 5 is a photo illustrating a process of collecting waste plastic.
Figure 6:
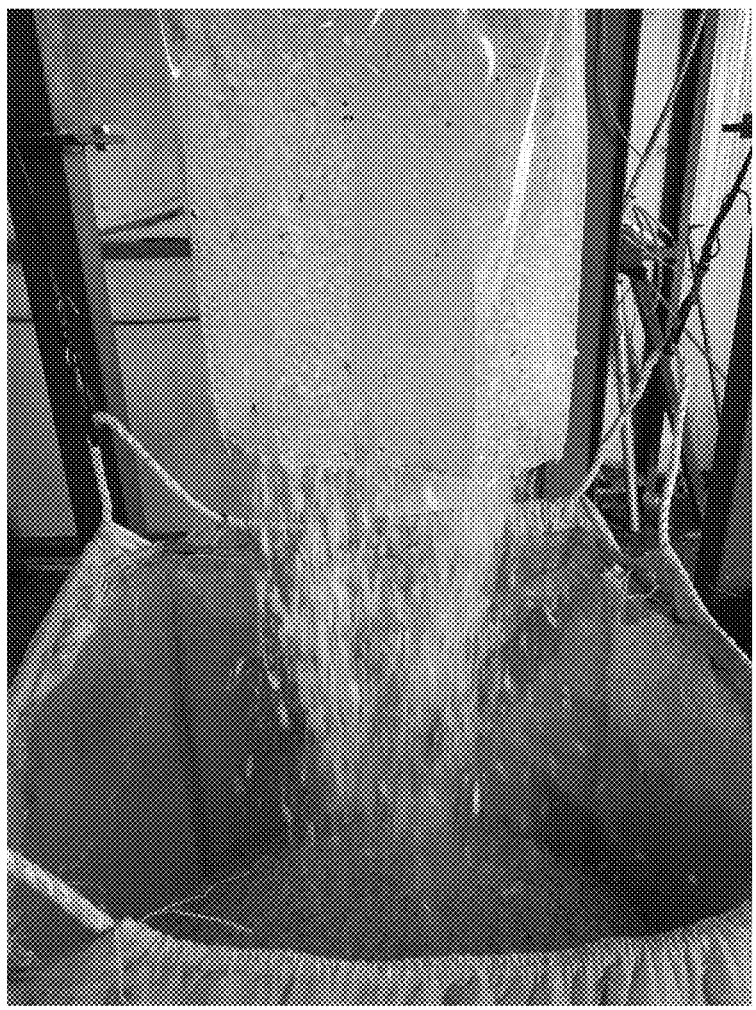
FIG. 6 is a photo illustrating a process of grinding waste plastic.
Figure 7:
FIG. 7 is a photo illustrating ground waste plastic.

The PETG may be obtained from scraps produced when extrusion injection molding is performed, or disposable containers. Specifically, waste plastic may be collected as shown in FIG. 5, and the scraps or disposable containers may be separated by measuring hardness and comparing carbonization. Then, the PETG separated in this way is ground through a plastic grinder as shown in FIG. 6, and is made into particles of 3 to 5 mm as shown in FIG. 7, and then, the particles are used as a material of the mixture.

The PETG may perform the role of determining a strength among characteristics of the mixture. Accordingly, in order to increase a strength of the synthetic wood to be manufactured, an amount of PETG has only to be increased, and, in order to make eco-friendly synthetic wood rather than synthetic wood having a high strength, the amount of PETG has only to be reduced.

The PETG has the demerit of a low thermal resistance. As the waste gypsum used in the present embodiment, residues that are dried to have a water content of 5% or less, among residues left after cement or a fertilizer is manufactured, may be ground and used. The waste gypsum may compensate for the low thermal resistance of the PETG, and may act as an auxiliary flame retardant to enhance flame retardancy of the synthetic wood.

When the content of the waste gypsum is less than 20 parts by weight for 100 parts by weight of the coffee grounds, there may be a problem that the thermal resistance and the flame retardancy of the synthetic wood do not satisfy reference values, and, when the content of the waste gypsum exceeds 100 parts by weight for 100 parts by weight of the coffee grounds, a load may increase when the synthetic wood is molded, causing a problem that a lifespan of a screw of a molding device is reduced and a hole of a die is clogged.

The PE-based lubricant may serve to prevent the waste gypsum, the coffee grounds, and the wood fiber from being carbonized by temperature in a screw of a cylinder and to smoothen a flow of PETG when extrusion molding is performed. Preferably, 102N may be used as a PE wax-based lubricant in the present embodiment.

The inorganic pigment may preferably use a sulfur oxide, an iron oxide, or a titanium oxide ($TiO_2$). In addition, an organic pigment may be additionally used when necessary, for the purpose of further changing color. In this case, the organic pigment may use, for example, carbon black. Nex, the mixture may be prepared by mixing the various materials prepared as described above in a mixer at 70 to 100° C. (S20).

In this case, when the temperature of the mixer is less than 70° C., molecular mixing among the materials may not be well performed, and in particular, there may be a problem that a binding force between the coffee grounds and the PETG is reduced, and, when the temperature of the mixer exceeds 100° C., at least part of the materials may be carbonized. In this case, the temperature of the mixer may be preferably 80° C.

Next, a second step of putting the mixture into a cooling device and cooling the mixture two times to reduce the temperature of the mixer to 40° C. or less is performed. During this process, the wood fiber absorbs moisture and oil remaining in the coffee grounds, and accordingly, problems caused by a tangle of raw materials occurring due to the ester-based oil may be solved.

Figure 8:
FIG. 8 is a photo illustrating a process of producing pellets.

Next, a third step of putting the mixture cooled at 40° C. or less into an extruder, and making pellets is performed as shown in FIG. 8.

The extruder may use a conical extruder having a screw of a cylinder of a diameter of 92 mm or longer. In this case, the screw of the cylinder may include 5 heaters and may be configured to control temperature, and a hole may be formed on a center of the cylinder to discharge oil mist. The temperature of the cylinder may be 230° C. in the first heater, 240° C. in the second heater, 210° C. in the third heater, 210° C. in the fourth heater, and 205° C. in the fifth heater with reference to a direction from a hopper to a die, and in this case, an error of temperature in each heater may be ±5° C.

The pellets manufactured in this way may preferably have a diameter of 3 to 5 mm, and a length of 2 to 4 mm.

Figure 9:
FIG. 9 is a photo illustrating a process of producing a product from pellets.

Next, a fourth step of putting the pellets into a molding device and forming synthetic wood of a desired shape is performed as shown in FIG. 9. In this case, the molding device may use the conical extruder described above again.

In this case, in order to mold a product in a desired shape, a structure of a mold may be appropriately designed. The mold may have a plate heater fastening portion fastened to a cylinder portion of a machine, and may be fastened within 300 mm, and a portion from a discharge portion to 300 mm may serve as a cooling portion through heating medium oil, and should maintain temperature of 100 to 150° C.

In addition, the molded synthetic wood may be cooled by passing through a portion after the discharge portion in the mold.

An operation of forming a pattern desired by a user on a surface of the synthetic wood by using an embossing machine, or smoothening the surface or processing into a predetermined pattern may further be performed when necessary.

The eco-friendly synthetic wood of the disclosure manufactured in the above-described method is an alternative to construction materials for wood that has the merits of wood and the merits of plastic, and may be easily manufactured through extrusion molding, and also, coffee grounds and waste gypsum which are waste resources are recycled, so that wastes can be reduced, and waste plastic which is difficult to recycle is utilized, so that the amount of plastic used can be reduced and an eco-friendly effect can be achieved.

The disclosure is not limited to the above-described embodiments. Accordingly, various substitutions, modifications, and changes can be made by those skilled in the art without departing from the spirit and scope of the disclosure as defined by the appended claims, and may be regarded as belonging to the scope of the disclosure.

EXPLANATION OF SINGS

S10: Step of preparing coffee grounds
S20: Step of preparing a mixture
S30: Step of cooling the mixture
S40: Step of making pellets from the mixture
S50: Step of forming synthetic wood

What is claimed is:

1. Eco-friendly synthetic wood containing coffee grounds, the synthetic wood comprising:
    coffee grounds;
    for 100 parts by weight of the coffee grounds,
    250 to 550 parts by weight of wood fiber;
    120 to 300 parts by weight of polyethylene terephthalate glycol (PETG);
    20 to 100 parts by weight of waste gypsum;
    5 to 15 parts by weight of a polyethylene (PE)-based lubricant; and
    5 to 15 parts by weight of an inorganic pigment.

2. The eco-friendly synthetic wood of claim 1, wherein the coffee grounds have a water content of 15% or less, and a content of ester-based oil is 14 to 16% by weight for the total weight of the coffee grounds, and
    wherein the waste gypsum has a water content of 5% or less.

3. A method for manufacturing eco-friendly synthetic wood containing coffee grounds, the method comprising:
    a first step of preparing a mixture by mixing coffee grounds, and, for 100 parts by weight of the coffee grounds, 250 to 550 parts by weight of wood fiber, 120 to 300 parts by PETG, 20 to 100 parts by weight of waste gypsum, 5 to 15 parts by weight of a PE-based lubricant, and 5 to 15 parts by weight of an inorganic pigment in a mixer at 70 to 100° C.;
    a second step of cooling the mixture two times to reduce a temperature of the mixture to 40° C. or less;
    a third step of putting the cooled mixture into an extruder and making pellets; and
    a fourth step of putting the pellets into a molding device and molding synthetic wood.

4. The method of claim 3, wherein, before the first step, an operation of drying the coffee grounds in a screw heater method to make a water content of the coffee grounds be 15% or less is performed, and
    wherein, at the first step, waste gypsum having a water content of 5% or less is used.

* * * * *